(No Model.)  2 Sheets—Sheet 1.

J. G. SMITH.
STOVE.

No. 245,572.  Patented Aug. 9, 1881.

WITNESSES
John A. Ellis
Philip Ellasi

INVENTOR
James G. Smith,
by Anderson & Smith
his ATTORNEYS (No Model.) 2 Sheets—Sheet 2.

J. G. SMITH.
STOVE.

No. 245,572. Patented Aug. 9, 1881.

WITNESSES
John A. Ellis
Philip H. Masi

INVENTOR
James G. Smith,
by Anderson & Smith
his ATTORNEYS

United States Patent Office.

JAMES G. SMITH, OF ALLIANCE, OHIO.

STOVE.

SPECIFICATION forming part of Letters Patent No. 245,572, dated August 9, 1881.

Application filed March 19, 1881. (No model.)

*To all whom it may concern:*

Be it known that I, JAMES G. SMITH, a citizen of the United States, resident at Alliance, in the county of Stark and State of Ohio, have invented certain new and useful Improvements in Stoves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
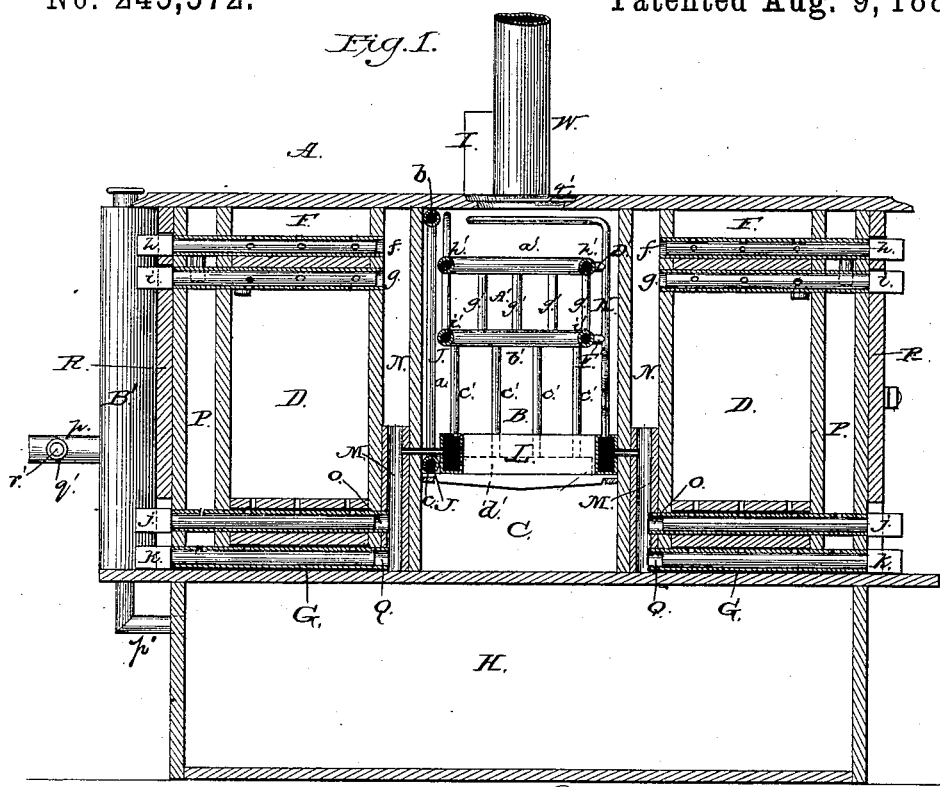
Figure 2:
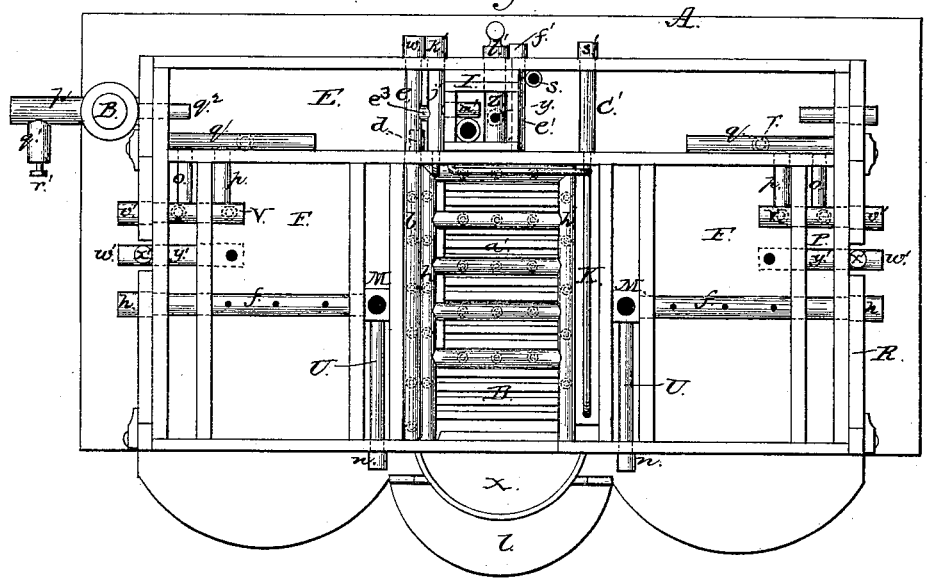
Figure 3:
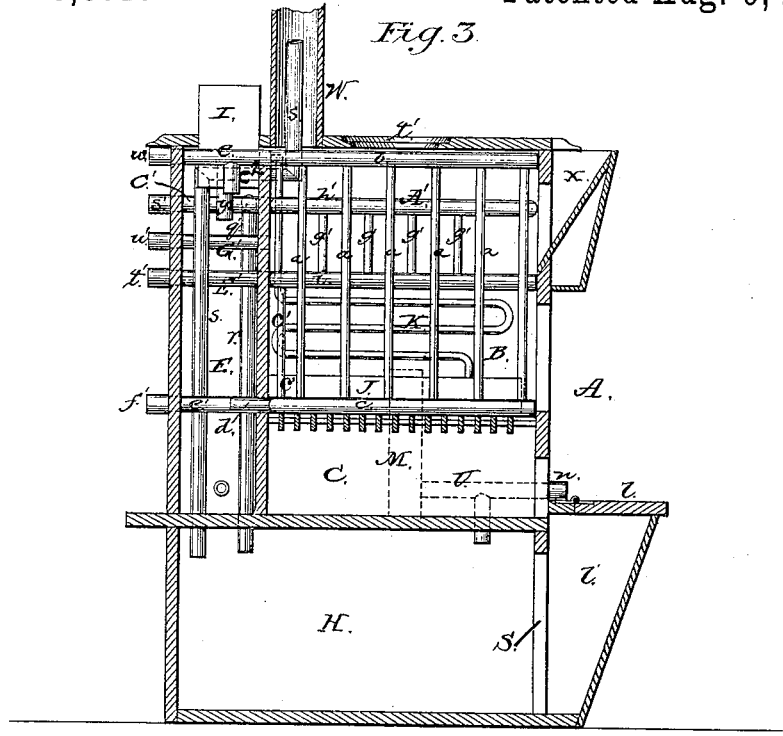

Figure 1 is a representation of a longitudinal section. Fig. 2 is a plan view with the top removed, and Fig. 3 is a vertical cross-section.

This invention relates to improvements in stoves, more particularly to that class whereto devices are applied for using steam for cooking and heating.

The object of the invention is the production of a device wherein steam can be used in a superheated condition for cooking or heating indirectly by radiation, or, after being superheated directly, for cooking by coming in contact with the articles of food, in either instance the steam coming immediately from the generator or mediately from a steam-chamber and reservoir.

The invention consists in a stove containing a steam-generator, superheater, radiators, steam-chambers, reservoir, and ovens, all constructed and arranged as hereinafter described.

In the annexed drawings, A represents a stove or range of ordinary construction, except in the particulars hereinafter pointed out.

B is the fire-chamber; C, the ash-pit; and D D the ovens, located one on each side of the fire-chamber. Behind these is the receiving and self-feeding reservoir E.

F are the steam-chambers above the ovens, and G those below.

H is a supply water-reservoir at the bottom of the stove.

I is a steam chamber or tank above the reservoir E.

J is a steam-generator, located at the lower part of the fire-chamber B, consisting of vertical tubes $a$ and upper and lower manifold tubes, $b$ and $c$, connected to vertical tubes $a$, as shown. The lower tube, $c$, communicates with the reservoir E by tube $d$, and the upper tube, $b$, with both the reservoir E and tank I by tube $e$ and its branches $e^2$ $e^3$, controlled by valve $w$, in manner and for purposes hereinafter mentioned.

K is a superheater within the fire-chamber B, passing to and fro along the sides of the same, and leading from tank I above to a distributer, L, below, which extends around the sides and back of the fire-chamber.

M is a tube leading from the distributer L into a steam-heating reservoir, N, located between the fire-chamber and the oven. Leading from this reservoir to the chamber F and to the upper part of oven D, respectively, are the tubes $f$ and $g$, having valves $h$ and $i$. By this construction the steam is diffused over a great area of heating-surface, and hence, when applied for cooking, is in a superheated condition and enters the ovens in a dry and intensely-hot state.

O is a tube leading from tube M into and through the lower part of the oven, for conducting steam therein, said tube O being provided with a valve, $j$. By thus bringing steam properly heated into the ovens the temperature maintained will produce the desired results in far less time than can be done by radiation from ordinary fire-heat or by steam by the ordinary flue arrangement.

P is a superheated-steam heating-chamber located outside of the oven D, communicating with the distributer L by the tube M, and by a tube, Q, leading through the chamber C, with which it also communicates, tube Q having valve $k$. By thus surrounding the ovens with steam-chambers the superheated steam within is kept up to the proper temperature. At any time cooking may be done by radiation by closing the valves $j$ and $i$ and opening valves $h$ and $k$, passing the steam into the surrounding chambers only, and not into the ovens.

R is a non-conducting removable casing placed outside of chamber P, to be used in summer to prevent the heat from coming out into the room, and to be removed in cold weather.

S is an opening located beneath the fire-chamber hearth, leading to chamber H from the front opening, $l'$, closed by the hinged hearth $l$, by means of which chamber H is supplied with water.

U is a tube for passing the steam from tube M to chamber H, controlled by valve $n$ for heating the water in chamber H.

V is a tube opening into chamber E, oven D, and chamber P, and having valve $v'$. From this tube V tubes $o$ and $p$ run to another tube, $q$, in reservoir E, and from which tube $q$ a tube, $r$, runs into chamber H. By these tubes surplus steam is conducted from the oven, chamber, and radiator to chamber H, where it is condensed or passes through a pipe, $s$, up into the smoke-pipe W. Pipes may be used leading to chamber H from the bottom of chambers F and G and oven D to carry off the water of condensation.

$A'$ is an additional steam-generator placed at the upper part of the fire-chamber, and consisting of upper and lower portions, $a'$ $b'$. Lower portion, $b'$, is located at the back end of the fire-chamber, and it is connected to the upper portion, $a'$, which is located over the top of the fire, above the bottom of the fire-feed $x$, and fills the upper space of fire-chamber B. Lower portion, $b'$, consists of the vertical tubes $c'$ and lower manifold tubes, $d$, the latter connected to the former and communicating with the reservoir E by the tube $e'$, having valve $f'$. Upper portion, $a'$, consists of vertical tubes $g'$, and connecting with these the upper and lower manifold tubes, $h'$ and $i'$, said upper tubes, $h'$, communicating with reservoir E and tank I by the tube $j'$, having valve $k'$. Vertical tubes $c'$ open into lower manifold tube, $i'$, at back end of fire-chamber B. The object of this additional steam-generator $A'$ is to furnish steam in larger quantity for heating rooms in winter than would be required for simply cooking in summer, and is so arranged that it may be used in winter or whenever desired as a steam-generator, while for summer use it may readily be converted into a superheater, and the number of tubes in generator J may thus be limited to the amount of steam required for summer use only. When used as a generator, valve $f'$ is opened and water passes from reservoir E into the lower portion, $b'$, and through the vertical tubes $c'$ into the upper portion, $a'$, and the steam generated passes into the upper manifold tubes, $h'$, and from these into reservoir E through tube $j'$ by opening valve $k'$, and from this into tank I' through tube $y$ by opening valve $l'$ in tube Z; or the steam may pass directly from the upper manifold tube, $h'$, into tank I by closing valves $k$ and $w$, which opens communication with said tank through tube $m'$. The steam-generator J acts with generator $A'$ by water entering the former through tube $d$, and the steam generated passing into reservoir E through tube $e$ by opening valve $w$, and from the reservoir E into tank I through tube $y$ by opening valve $l'$ in tube Z; or the steam may pass directly into tank I by closing valves $w$ and $k'$ through tube $m'$.

The reason for passing steam through the reservoir and tank, or the latter alone, is this: When used for heating a building great pressure is needed, in which case steam is passed into the reservoir E, and water is forced therein by the force-pump B', which pump is provided with a spout, $p'$, for furnishing water for family use from chamber H, and said spout $p'$ is provided with a tube, $q'$, having a valve, $r'$, by means of which pump water may be forced either through spout $p'$ or into the reservoir E through tube $q^2$.

In summer, when but little steam is required for cooking only, additional pressure is not needed, as the column of water in reservoir E is sufficient to maintain the feed and to supply water to the generator J, and the steam generated may pass directly into tank I, which saves time and fuel, steam being used as soon as generated, and no heat being lost by the heating of water in reservoir E—a disadvantage which would be experienced only when fires are made from day to day, and not when a constant heat is kept up, as in winter.

If need be, the generator may be enlarged by conducting tubes across the bottom of the fire-chamber forming the grate.

$C'$ is a tube having valve $s'$, and communicating with the tube $h'$ through tube $D'$. $E'$ is a tube having valve $t'$, and communicating with tube $i'$ through tube $F'$. Tubes $D'$ and $F'$ connect the upper and lower portions of generator $A'$ with the superheater K.

$G'$ is a tube leading to superheater K between the points of connection of tubes $D'$ and $F'$, and having the valve $u'$.

Steam formed in the generators and passed into tank I passes from this into superheater K by closing valves $s'$ and $t'$, which shuts off communication between generator $A'$ and superheater K, and opening valve $u'$, which makes a clear passage through the superheater. From this superheater it passes on to the distributer and through the circuit to chamber H, as before described. This is the operation when used for cooking only.

When used to warm a building, instead of the steam passing to chamber H, a conducting-pipe is attached to tube $w'$, and valve $x'$ in tube $y'$ is opened, forming communication with ovens D, and valve $v'$ in tube V is closed, by which a free circulation from the ovens and their surrounding chambers passes off into the building.

When it is desired to use generator $A'$ as a superheater, as in summer, the valve $f'$ of its water-supply is closed, valves $s'$ and $t'$ are opened, and valve $u'$ is closed. Steam from generator J passes into tank I, through tube $a^2$ into the upper part of superheater K, and through tube $D'$ into the upper tube, $h'$, of generator $A'$, from the lower tube, $i'$, into the lower part of the superheater K, through tube $F'$, and on, as before described.

$T'$ are griddle-openings in the top plate of the stove, located over steam-chambers F, for setting cooking utensils in.

The steam-chamber I is to be provided with an improved safety-valve and alarm-whistle, located on top of and communicating with the said steam-chamber I, by means of which an alarm will be sounded when all the valves are closed and undue pressure accumulates in the steam-chambers.

It will be seen that this device presents striking and highly-beneficial advantages. The admission of superheated steam into immediate contact with the articles to be cooked in the ovens expedites the cooking materially, and the surrounding of the ovens with a steam-jacket, as it were, keeps the steam within at a high temperature with little loss of its heat. The two generators render the device capable, by proper adjustment, of use in summer or winter without any inconvenience.

It is evident that the invention herein stated is applicable to a great variety of cooking devices, ranges, furnaces, &c.

Many arrangements of pipes, chambers, &c., might be suggested wherein the broad idea could be carried out.

As far as my knowledge goes, I am the first to introduce superheated steam directly into an oven to come in contact with the food therein, and to provide a device adapted for use at different times of the year and under varying demands.

In setting forth my invention I have described one way in which it is carried out, while others might be found. The distributer-chambers, tubes, &c., act as a conduit for the steam and are eminently useful, yet the steam might be passed direct without the intervention of these, though without as good an effect; hence the present case should not be confined to the precise construction.

I claim—

1. In a stove in which steam is directly admitted to the articles to be cooked, a steam generator and superheater located in the fire-chamber, in combination with an oven and means of communication, whereby steam generated by the heat of the stove-fire is superheated by the same, and is then passed to the oven, as set forth.

2. Steam-generator J, superheater K, and distributer L, in combination with oven D and means, substantially as described, for connecting the same, as set forth.

3. In a stove or range arranged for a greater or less supply of superheated steam, as required, two generators and a superheater connected to one of them, and means, substantially as described, whereby one of the generators can be converted into a superheater, as set forth.

4. A stove or range having as part of its structure a water-supply chamber and pump, as set forth.

In testimony whereof I affix my signature in presence of two witnesses.

JAMES GREGORY SMITH.

Witnesses:
J. D. LEWIS,
K. Z. SMITH.